(12) United States Patent
Lanigan, Sr. et al.

(10) Patent No.: US 9,809,358 B2
(45) Date of Patent: Nov. 7, 2017

(54) SELF-LATCHING INTERBOX CONNECTOR FOR AUTOMATIC SECUREMENT OF A TOP CONTAINER TO A BOTTOM CONTAINER

(71) Applicant: Mi-Jack Products, Inc., Hazel Crest, IL (US)

(72) Inventors: John J. Lanigan, Sr., Orland Park, IL (US); Martin C. Conneally, Downers Grove, IL (US); Antonio Carlos Callado Souza, Chicago, IL (US); Jason Schmidt, Flossmoor, IL (US); Kevin Gerald Muszynski, Lockport, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 233 days.

(21) Appl. No.: 14/516,050

(22) Filed: Oct. 16, 2014

(65) Prior Publication Data

US 2016/0107804 A1 Apr. 21, 2016

(51) Int. Cl.
*B65D 45/22* (2006.01)
*B60P 7/13* (2006.01)
(Continued)

(52) U.S. Cl.
CPC .............. *B65D 45/22* (2013.01); *B60P 7/13* (2013.01); *B65D 21/0209* (2013.01);
(Continued)

(58) Field of Classification Search
CPC .............. B65D 90/0013; B65D 90/00; B65D 90/0006; B65D 45/22; B65D 21/0209;
(Continued)

(56) References Cited

U.S. PATENT DOCUMENTS 2,424,429 A * 7/1947 Bamberg .................. B60P 7/13
410/116
3,691,595 A * 9/1972 Backteman ........ B65D 90/0013
220/1.5
(Continued)

OTHER PUBLICATIONS

International Search Report and Written Opinion dated Jan. 4, 2016, for International Application No. PCT/US2015/054990, Applicant, Mi-Jack Products, Inc. (11 pages).
(Continued)

*Primary Examiner* — Joshua J Michener
*Assistant Examiner* — Matthew Gitlin
(74) *Attorney, Agent, or Firm* — McCracken & Gillen LLC

(57) ABSTRACT

An interbox connector used in intermodal transportation systems is provided. The interbox connector is adapted to secure a top container to a bottom container in which the top container and bottom container each have corner castings. A plate is configured to be positioned between a corner casting of the bottom container and a corner casting of the top container prior to the top container being stacked on the bottom container. A first latch extends upwardly from the plate in which the first latch is configured to be disposed in the corner casting of the top container. A second latch extends downwardly from the plate in which the second latch is configured to be disposed in the corner castings of the bottom container. Placement of the top container on top of the bottom container causes the second latch and the first latch to automatically rotate and secure the top container to the bottom container.

19 Claims, 14 Drawing Sheets

(51) Int. Cl.
  *B65D 21/02* (2006.01)
  *B65D 90/00* (2006.01)
(52) U.S. Cl.
  CPC .. *B65D 90/0013* (2013.01); *B65D 2590/0033* (2013.01); *Y10T 24/28* (2015.01); *Y10T 403/55* (2015.01)
(58) Field of Classification Search
  CPC .... B65D 2590/0033; B65D 2590/0016; B65D 88/121; Y10T 403/55; Y10T 403/557; Y10T 24/28; B60P 7/13; B60P 7/132; B63B 25/004; Y10S 24/53
  USPC ........ 410/69, 82, 70, 76, 77, 73, 78, 79, 83; 24/287, 590.1; 403/325, 373
  See application file for complete search history.

(56) References Cited

U.S. PATENT DOCUMENTS

| | | | | |
|---|---|---|---|---|
| 3,752,511 | A * | 8/1973 | Racy | B65D 90/0013 206/512 |
| 3,972,439 | A | 8/1976 | DiMartino | |
| 4,277,212 | A * | 7/1981 | Rosaia | B65D 90/0013 24/287 |
| 4,599,829 | A * | 7/1986 | DiMartino, Sr. | E04B 1/3483 410/79 |
| 4,626,155 | A * | 12/1986 | Hlinsky | B60P 7/132 114/75 |
| 5,062,752 | A * | 11/1991 | Takaguchi | B65D 90/0013 24/287 |
| 5,454,673 | A | 10/1995 | DiMartino | |
| 5,632,586 | A * | 5/1997 | Nyholm | B65D 90/0013 403/348 |
| 6,336,765 | B1 * | 1/2002 | Watanabe | B65D 90/0013 24/287 |
| 6,460,227 | B2 | 10/2002 | Hove | |
| 6,490,766 | B1 | 12/2002 | Tiemann | |
| 6,974,164 | B2 * | 12/2005 | Brewster | B60P 7/13 292/104 |
| 7,114,898 | B2 * | 10/2006 | Brewster | B60P 7/132 410/69 |
| 7,621,414 | B2 * | 11/2009 | Bederke | B65D 90/0013 206/512 |
| 7,896,593 | B2 * | 3/2011 | Brewster | B60P 7/132 24/287 |
| 7,942,601 | B2 * | 5/2011 | Bohman | B60P 7/132 220/1.5 |
| 8,348,564 | B2 | 1/2013 | Fukui | |
| 8,458,861 | B2 * | 6/2013 | Ostberg | B60P 7/132 24/287 |
| 8,684,644 | B2 * | 4/2014 | Metternich | B60P 7/132 410/77 |
| 2009/0307877 | A1 * | 12/2009 | Boman | B60P 7/132 24/287 |
| 2010/0303573 | A1 * | 12/2010 | Brewster | B61D 45/007 410/69 |

OTHER PUBLICATIONS

International Preliminary Report on Patentability of International Application No. PCT/US2015/054990, dated Apr. 18, 2017, Applicant Mi-Jack Products, Inc. (5 pages).

* cited by examiner

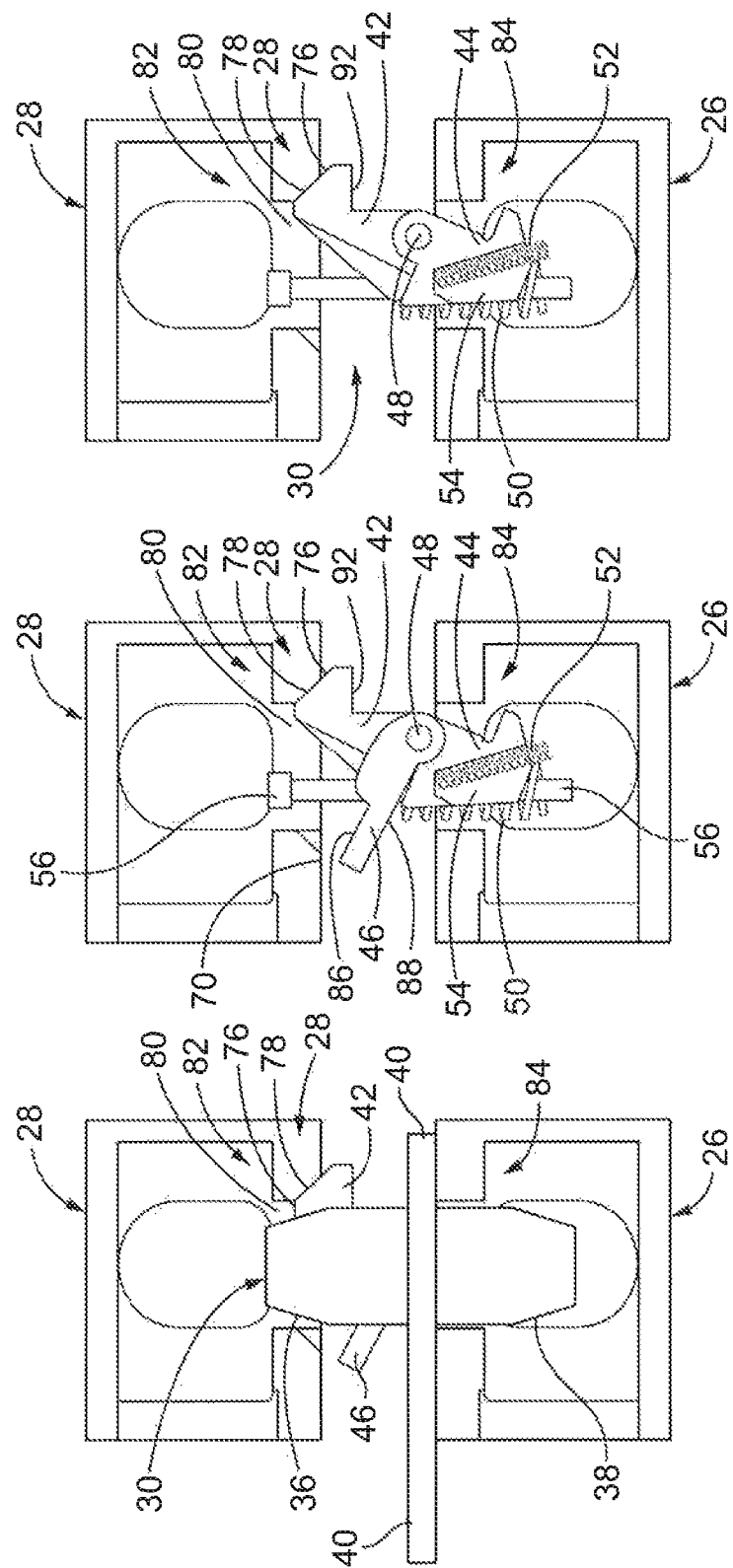

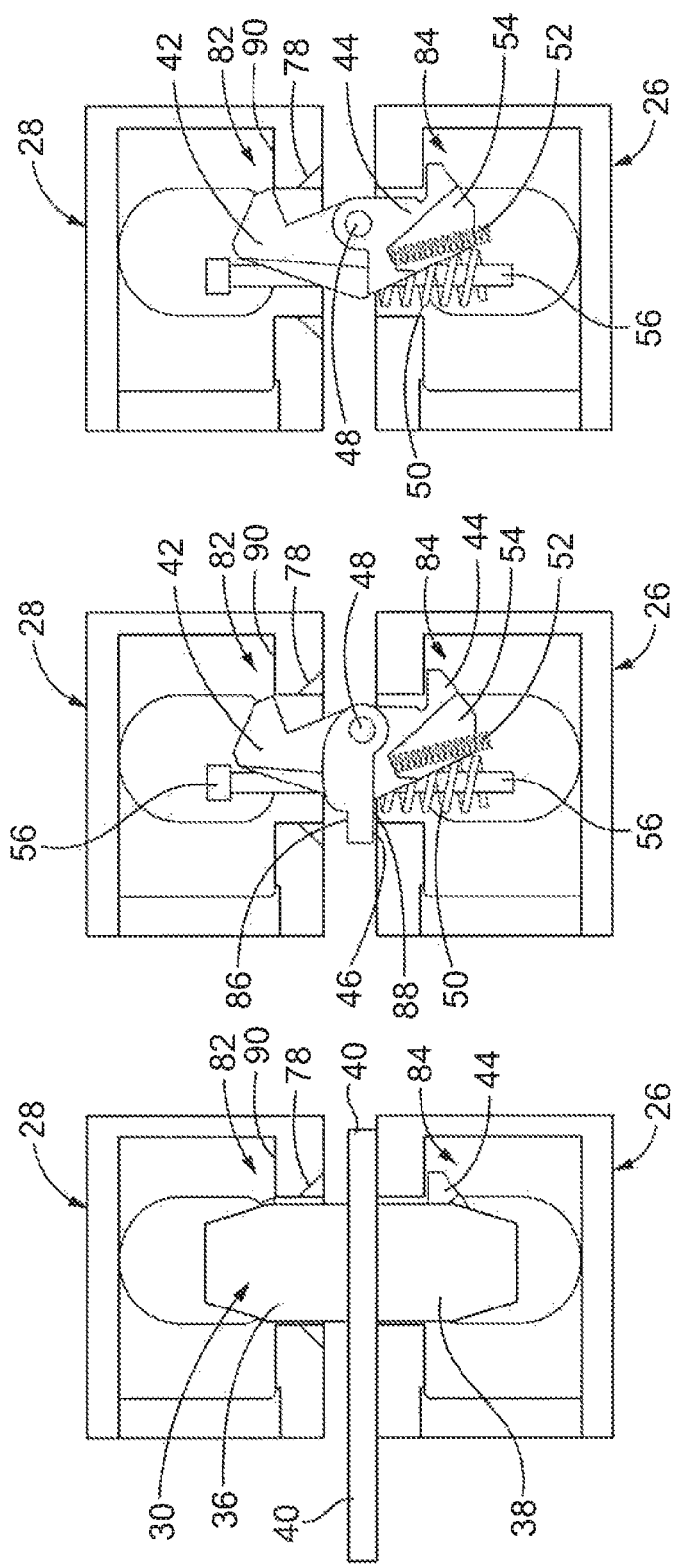

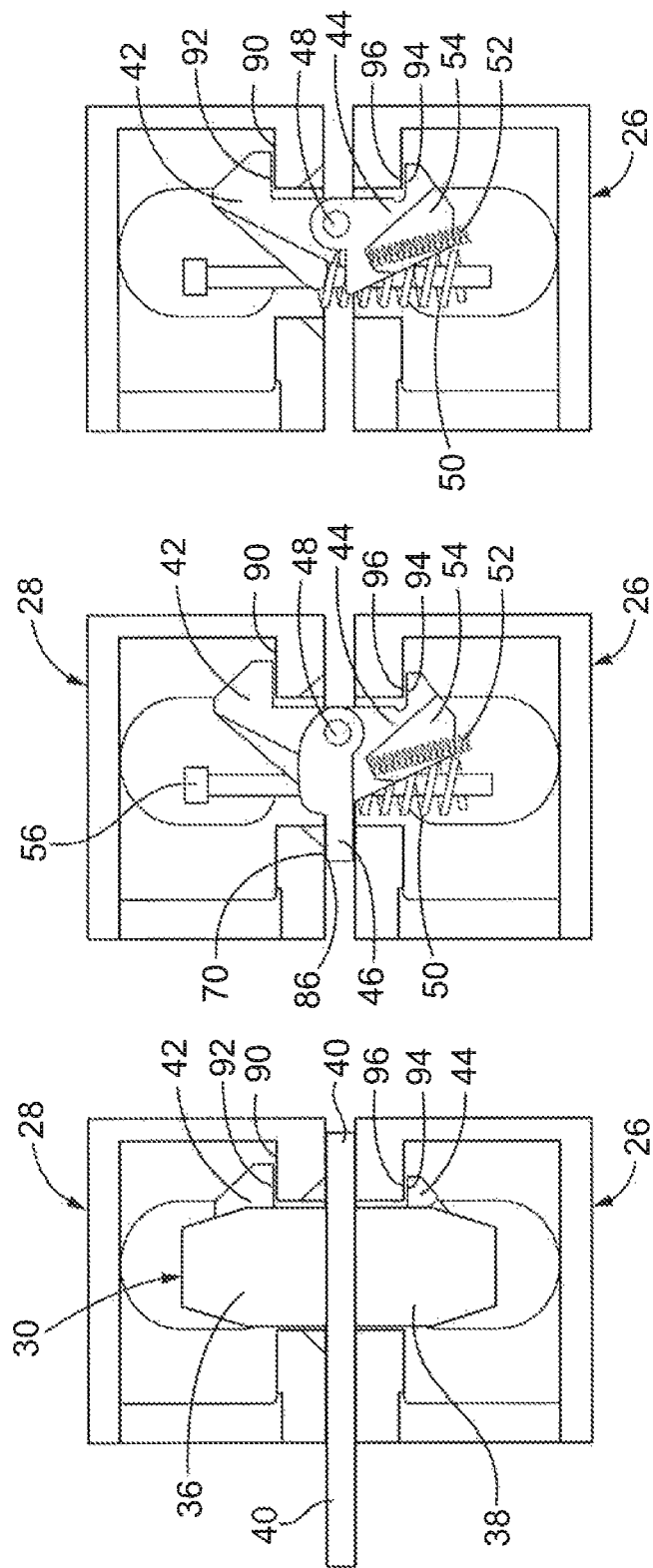

SELF-LATCHING INTERBOX CONNECTOR FOR AUTOMATIC SECUREMENT OF A TOP CONTAINER TO A BOTTOM CONTAINER

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF THE DISCLOSURE

The present subject matter relates to latching systems for securement of containers. More particularly, the present subject matter relates to interbox connectors for securement of a top intermodal container to a bottom intermodal container.

BACKGROUND

Various types of conventional interbox connectors have been used in the field of intermodal container transportation. For instance, an interbox connector may be used to couple and lock a bottom corner casting of a top container to a top corner casting of a bottom container when shipping containers are shipped by rail in double stack rail cars. Disadvantageously, such conventional interbox connectors may require multiple manual labor operations when securing a top container to a bottom container in a double stack rail car arrangement. Certain manual interbox connectors, for example, require manual action to lock the interbox connector into both the bottom corner casting of the top container and the top corner casting of the bottom container. For instance, a worker may be required to manually latch an interbox connector device into securement beyond manually inserting the connector into place. The use of other conventional interbox connectors also requires at least one manual locking operation. In a double stack rail car arrangement, use of conventional interbox connectors often requires a rail worker to climb onto the rail car to perform the operation of locking top and bottom intermodal containers in place. Thus, there exists a need for an improved automatic self latching interbox connector.

SUMMARY

An interbox connector used in intermodal transportation systems is provided. The interbox connector is adapted to secure a top container to a bottom container in which the top container and bottom container each have corner castings. A plate is configured to be positioned between a corner casting of the bottom container and a corner casting of the top container prior to the top container being stacked on the bottom container. A first latch extends upwardly from the plate in which the first latch is configured to be disposed in the corner casting of the top container. A second latch extends downwardly from the plate in which the second latch is configured to be disposed in the corner casting of the bottom container. Placement of the top container on top of the bottom container causes the second latch and the first latch to automatically rotate and secure the top container to the bottom container.

Other aspects and advantages of the present invention will become apparent upon consideration of the following detailed description and the attached drawings wherein like numerals designate like structures throughout the specification.

BRIEF DESCRIPTION OF THE DRAWINGS

FIG. 5A illustrates the interbox connector in an unlatched position with sections of the bottom corner casting of the top container and the top corner casting of the bottom container;

FIG. 5B illustrates the interbox connector in the unlatched position of FIG. 5A with the upper housing, lower housing and middle plate removed;

FIG. 5C illustrates the interbox connector in the unlatched position of FIG. 5B with the lever removed;

FIG. 6A illustrates the interbox connector of FIG. 5A with the bottom corner casting of the top container being lowered towards the top corner casting of the bottom container;

FIG. 6B illustrates the positioning of the interbox connector of FIG. 6A with the upper housing, lower housing and middle plate removed;

FIG. 6C illustrates the positioning of the interbox connector of FIG. 6B with the lever removed;

FIG. 7A illustrates the interbox connector of FIG. 5A in a latched position with the bottom corner casting of the top container lowered onto the top corner casting of the bottom container;

FIG. 7B illustrates the interbox connector in the latched position of FIG. 7A with the upper housing, lower housing and middle plate removed;

FIG. 7C illustrates the interbox connector in the latched position of FIG. 7B with the lever removed;

DETAILED DESCRIPTION

Figure 1:
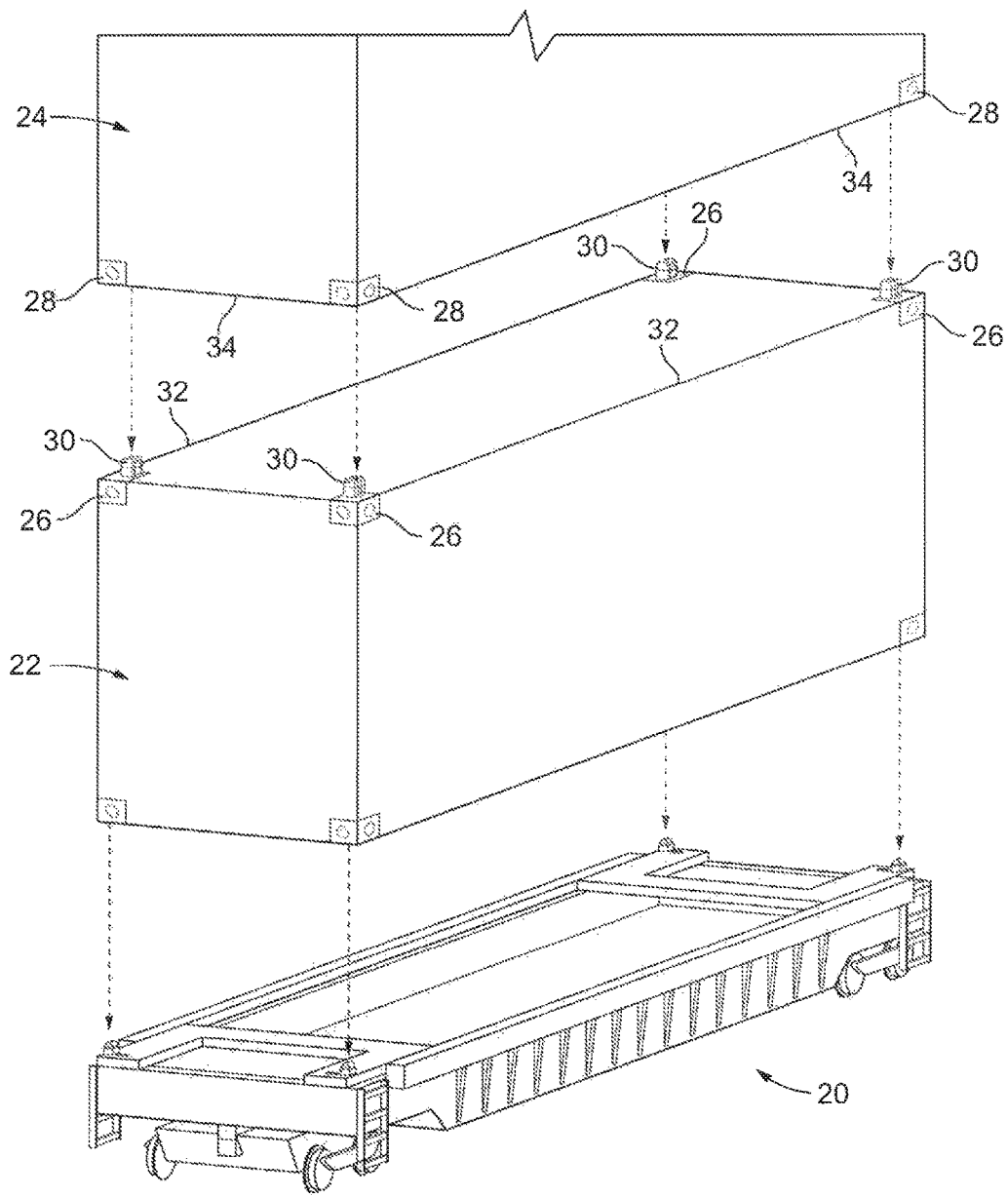
FIG. 1 is an isometric view of a rail well car for receipt of a bottom intermodal container and a top intermodal container secured by interbox connectors.

An interbox connector that is used to secure a top container to a bottom container in intermodal transportation systems is described herein. As seen, the interbox connector allows for automatic latching and unlatching of empty, filled or partially filled containers, such as containers used in a double stack rail car arrangement. In the drawings, like reference numbers can note like structures throughout.

Referring to FIG. 1, a rail well car 20 is shown for receipt of a bottom intermodal container 22 and a top intermodal container 24 in a double stack rail car arrangement. The bottom container 22 and top container 24 each have a plurality of corner castings 26, 28 generally located proximate top and bottom edge surfaces 32, 34 of the containers 22, 24. In this example, the corner castings are located proximate top and bottom corners of the containers 22, 24 such that four top corner castings and four bottom corner castings are employed for each container. In this arrangement, the length of the railcar container may, for example, be approximately forty feet with four top and bottom corner castings positioned proximate each of the top and bottom corners of the approximately forty foot railcar container. Other arrangements and other total numbers of corner castings for containers may be employed. For instance, in other examples in which the length of the container exceeds forty feet, an additional four corner castings (resulting in a total of eight corner castings) may be located inward of the respective corners, but spaced forty feet apart along the top and bottom edges of the containers. Additionally, corner castings that may be used for intermodal applications may be at positions of approximately forty feet. The bottom, for example, may have two containers of approximately twenty feet, a container of approximately forty feet or a container greater than forty feet. The top may have a container of approximately forty feet or greater. Additional corner castings on containers greater than forty feet may, for example, be used when being secured to a chassis. An interbox connector 30 is configured to be positioned in the respective top corner castings 26 of the bottom container 22. Prior to the top container 24 being lowered onto the bottom container 22, the interbox connector 30 engages with the bottom corner castings 28 of the top container 24. As seen herein, placement of the top container 24 on top of the bottom container 22 causes latches of the interbox connector 30 to automatically rotate and secure the top container 24 to the bottom container 22.

Figure 2:
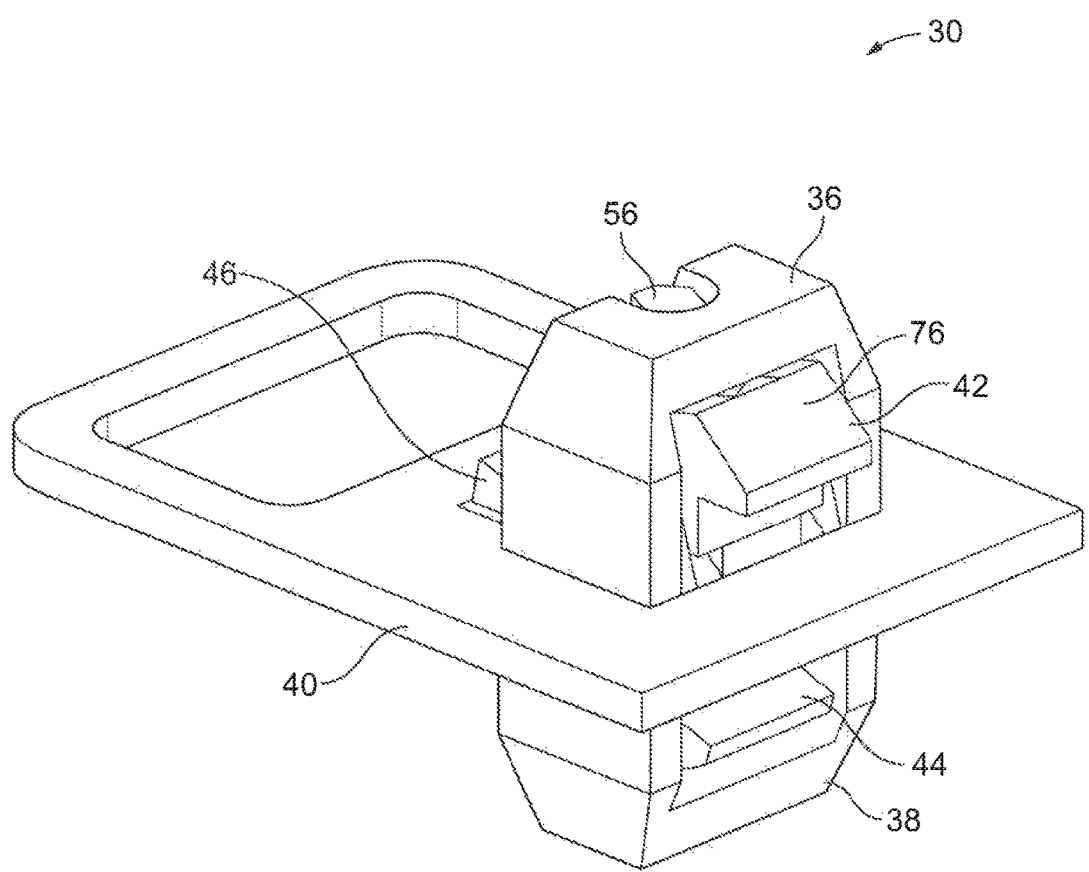
FIG. 2 is a front isometric view of an interbox connector.
Figure 3:
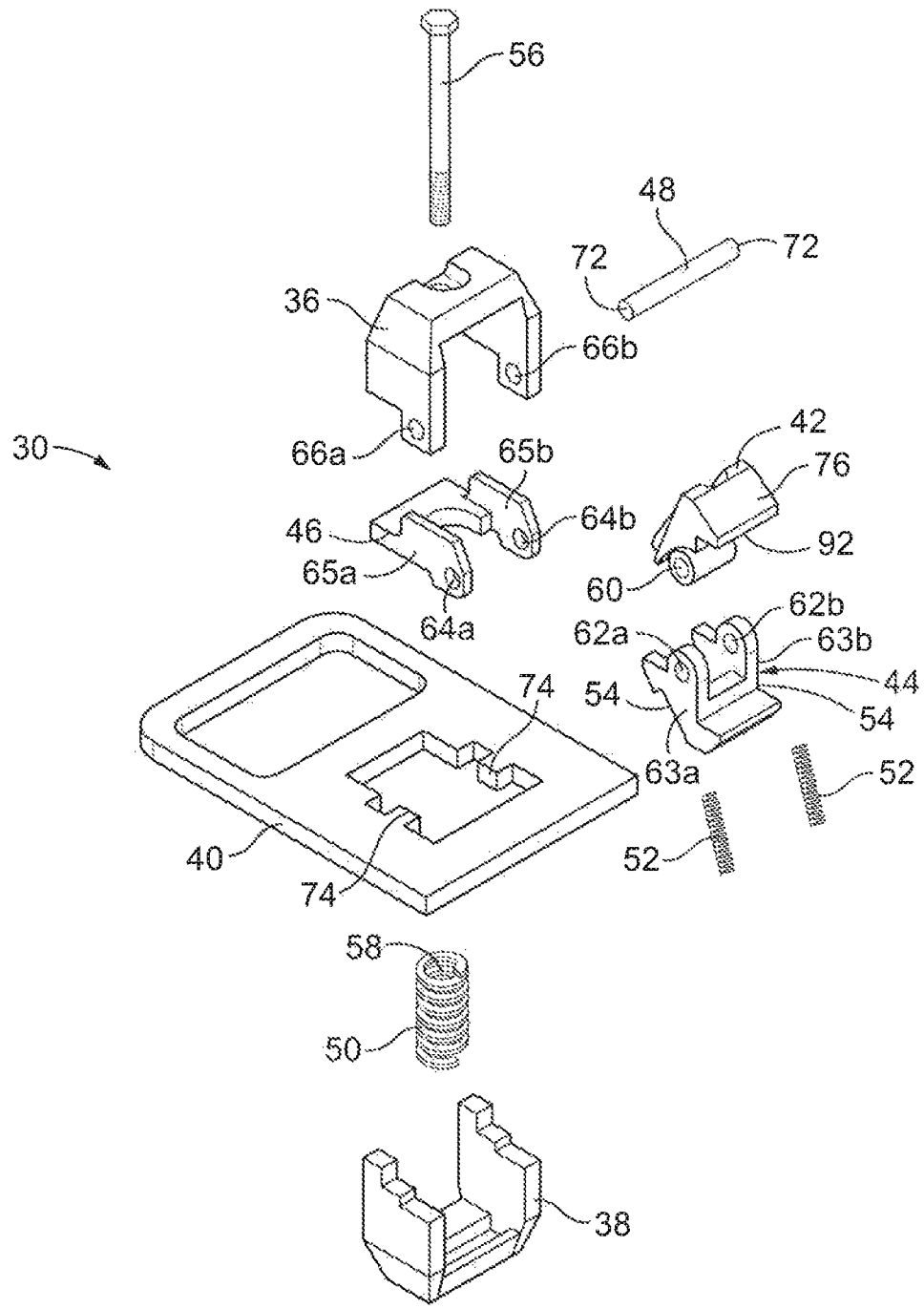
FIG. 3 is an exploded view of the interbox connector of FIG. 2.

Referring to FIGS. 2 and 3, an example interbox connector 30 is shown first as an isometric view of the connector in FIG. 2 and as an exploded view in FIG. 3. The interbox connector 30, in this example, includes top housing 36, bottom housing 38, with middle plate 40 disposed therebetween. A top latch 42 extends upwardly from the plate 40 and a bottom latch 44 extends downwardly from the plate 40. A lever 46 is mechanically coupled to the top latch 42 and the bottom latch 44 through a center pin 48 (FIG. 3) that is in line with the middle plate 40. The top latch 42 is spring loaded to a latched position by being mechanically coupled with large spring 50 and bottom latch 44 is spring loaded to an unlatched position. A pair of small springs 52 are positioned within respective recesses 54 on opposing sides of the bottom latch 44 to allow the bottom latch 44 to return to an unlatched position from a latched position. In this example, a connecting bolt 56 is employed through the assembly to aid in securement of top housing 36, lever 46, middle plate 40, central coil 58 of spring 50, bottom latch 44, and bottom housing 38 of the interbox connector 30.

As seen in FIG. 3, a bore 60 extends through a central portion of top latch 42 and a pair of bores 62a, 62b are formed through respective side walls 63a, 63b of the bottom latch 44. Lever 46 also has a pair of bores 64a, 64b at respective sidewalls 65a, 65b, in this example, with top housing 36 similarly having respective bores 66a, 66b. Center pin 48 is positioned and received through bores 66a, 66b of top housing 36, bores 64a, 64b of lever 46, bores 62a, 62b of bottom latch 44 and bore 60 of top latch 42. Pin 48 is positioned through bore 60 of top latch 42 and through the bores 62a, 62b of bottom latch 44 such that the top latch 42 is rotatable about the pin 48 in one direction, (e.g., counter clockwise) when movement is initiated to the latching position and the bottom latch 44 is rotatable about the pin 48 in the same direction when movement is initiated to the latching position. The pin 48 is also positioned through the bores 64a, 64b of lever 46 to provide rotational movement of the lever 46 about the pin 48.

Figure 4:
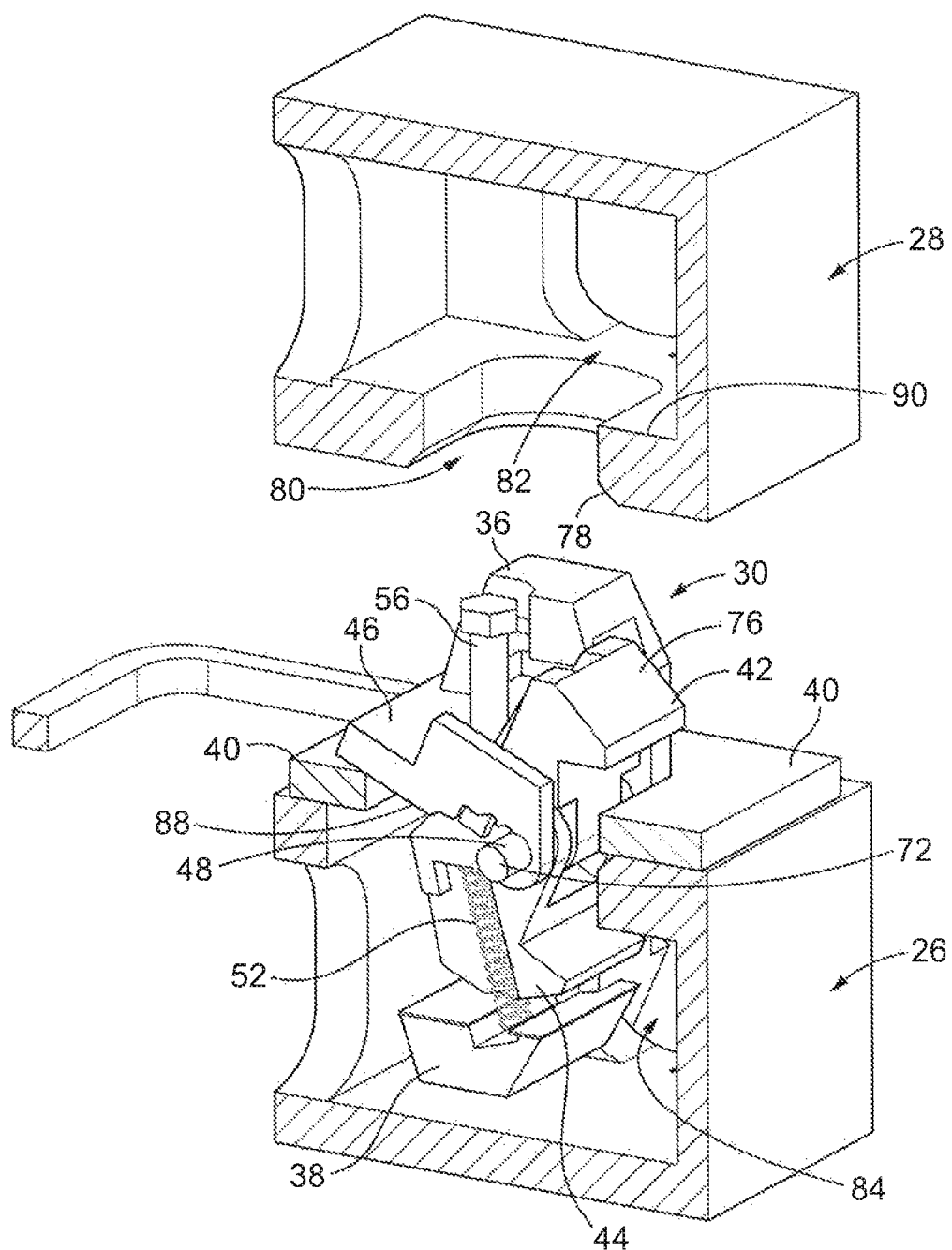
FIG. 4 is a front isometric partial cut away view of the interbox connector of FIG. 2 positioned within a top corner casting for a bottom container and a bottom corner casting for a top container positioned above the interbox connector.

As will be seen with reference to FIGS. 5-7, the self latching interbox connector 30 has large spring 50 positioned to engage a bottom portion of top latch 42 to provide a spring loaded latching operation when the interbox connector 30 is placed between a bottom container 22 and a top container 24. As shown in further detail below, top latch 42 is initially spring loaded into position by large spring 50. Top latch 42 is then rotated back when bottom corner casting 28 of the top container 24 engages top latch 42. (See FIGS. 5 and 6). When the top container 24 is placed on the bottom container 22, the top latch 42 springs back (via spring 50) to the latched position. In operation, the top latch 42 also drives bottom latch 44 into a latched position. As seen in FIG. 7B, when the top container 24 is stacked on the bottom container 22, the bottom latch 44 is held into position by the lever 46. The lever 46 is held by the bottom face 70 of the bottom corner casting 28 of the top container 24 (FIG. 7B). As seen in FIG. 4, the center pin 48 is used to couple the bottom latch 44, top latch 42, lever 46 and top housing 36. The bolt 56 fastens the top housing 36 and bottom housing 38 to the middle plate 40 and the large spring 50. The center pin 48 is retained within the top housing 36 with ends 72 of the center pin 48 positioned proximate notches 74 (FIG. 3) in the middle plate 40. Recesses 54 in the bottom latch 44 and the bottom housing 38 retain the smaller springs 52. Springs 52 hold the bottom latch 44 in place when the bottom latch 44 is not being engaged by the top latch 42 or lever 46 (See FIGS. 7A-7C).

Referring to FIG. 4, a partial cut away view of the interbox connector 30 in an unlatched position is shown positioned within a top corner casting 26 for a bottom container 22 and a bottom corner casting 28 for a top container 24 positioned above and approaching the interbox connector 30 is shown. As seen, the interbox connector 30 interacts and latches with the corner castings 26, 28 to provide securement of the top container 24 to the bottom container 22. When the interbox connector 30 is inserted into a top corner casting 26 of a bottom container 22, as seen in FIG. 4, the middle plate 40 is configured such that it is positioned between the top corner casting 26 of the bottom container 22 and the bottom corner casting 28 of the top container 24 as the top container 24 is being stacked on the bottom container 22. The top latch 42 extends upwardly from the middle plate 40 and the bottom latch 44 extends downwardly from the middle plate 40 such that the top latch 42 is able to be disposed within the bottom corner casting 28 of the top container 24 and the bottom latch 44 is able to be disposed within the top corner casting 26 of the bottom container 22. The center pin 48 is positioned for securement with the middle plate 40 enabling the top latch 42 to rotate above the plate 40 and the bottom latch 44 to rotate below the plate 40. As seen, placement of the top container 24 on the bottom container 22 causes the bottom latch 44 and then the top latch 42 to automatically rotate and secure the top container 24 to the bottom container 22.

Conversely, the action of unloading or removing the top container 24 from the bottom container 22 automatically moves the latch 42 into the unlatched position. Once latch 42 is clear of bottom corner castings 28 of top container 24, the springs 52 return bottom latch 44 to the original unlatched starting position. The movement of latch 42 returning to its original unlatched position simultaneously drives latch 44 to its original starting position. The interbox connector 30, in turn, is unlocked from both the bottom container 22 and the top container 24.

FIGS. 5A-5C illustrate the interbox connector 30 in an unlatched position with the bottom corner casting 28 of the top container 24 making initial contact with the top latch 42 of the interbox connector. Initially, top latch 42 is spring loaded into position by spring 50. As seen in FIGS. 4, 5B and 5C, the top latch 42 and the bottom latch 44 are positioned to rotatably pivot about a longitudinal axis of the center pin 48. The top latch 42 has a sloped surface 76 on an upper portion of the top latch 42. When the middle plate 40 is placed on a top corner casting 26 such that the bottom housing 38 of the interbox connector 30 is inserted in the top corner casting 26 of the bottom container 22, the sloped surface 76 of the top latch 42 extends outside the top housing 36 in an unlatched position. The sloped surface 76 of the top latch 42 is configured to contact the bottom corner casting 28 of the top container 24 as the top container is lowered on top of the bottom container 22 causing the top latch 42 to rotate in one direction (e.g., a counter clockwise direction towards the top housing as seen in views of FIGS. 5A-5C and 6A-6C). As the top container 24 continues to lower, contact of an angled wall 78 of the bottom corner casting 28 with the sloped surface 76 of the top latch 42 of the interbox connector 30 causes the top latch 42 to rotate in the direction back towards the top housing 36 against the spring bias force applied by spring 50. (See FIGS. 5A-5C and 6A-6C). The sloped surface 76 of the top latch 42 engages the angled wall 78 of an opening 80 of the bottom corner casting 28 of the top container 24 such that a camming action is applied to the top latch 42 and causes the bottom latch 44 to rotate about the center pin 48 in the same direction as the top latch 42 (e.g., a counterclockwise direction as seen in the views of FIGS. 5A-5C and 6A-6C). The top latch 42 and bottom latch 44 abut against one another at a common contact surface as seen in FIGS. 5A-5C and 6A-6C. Due to the contact of the top latch 42 with the bottom latch 44, as seen in FIGS. 5A-5C, and the arrangement of both the top and bottom latches 42, 44 on the center pin 38, the camming action on the top latch 42 also causes the bottom latch 44 to rotate about the center pin 38.

As the top container 24 (with bottom corner casting 28) is continued to be lowered, the top latch 42 of the interbox connector 30 continues to rotate until the top latch 42 is positioned inside an aperture 82 of the bottom corner casting 28 of the top container 24. (See FIGS. 6A-6C). The rotation of the top latch 42 causes rotation of the bottom latch 44 to extend into an aperture 84 of the top corner casting 26 of the bottom container 22 and engage the top corner casting 26. Upon rotation, recesses 54 of the bottom latch 44 accordingly move with springs 52 therein applying a spring biased force to the bottom latch 44. The lever 46 is also positioned for rotation about the center pin 48 and is mechanically coupled via the center pin 48 with the bottom latch 44. When the top container 24 is lowered onto the bottom container 22, a top surface 86 of the lever 46 of the interbox connector 30 contacts the bottom corner casting 28 of the top container 24 (See FIGS. 6B and 7B). A bottom surface 88 of the lever 46 is also in contact with the bottom latch 44. The weight of the top container 24 on the lever 46 maintains the lever 46 in contact with the bottom latch 44 when the top container 24 is lowered onto the bottom container 22 and, in turn, maintains the bottom latch 44 to be held in contact with the top corner casting 26 of the bottom container 22 (See FIG. 7B). When the top container 24 is completely lowered onto the bottom container 22, the large spring 50 applies a force to the top latch 42 to move the top latch 42 forward and into engagement with an inner wall 90 of the bottom corner casting 28 of the top container 24. In particular, a flat surface of wall 92 of the top latch 42 contacts the inner wall 90 of the bottom corner casting 28 to provide engaged securement of the top latch 42 and the bottom corner casting 28. (See FIGS. 7A-7C). Additionally, the flat surface of wall 94 of bottom latch 44 contacts inner wall 96 of the top corner casting 26 thereby providing securement of the bottom and top corner castings 26, 28 in locking engagement. As seen in FIG. 7A-7C, both the top latch 42 and bottom latch 44 are moved to the latched position whereby the top latch 42 is in locked engagement with the bottom corner casting 28 of the top container 24 and the bottom latch 44 is in locked engagement with the top corner casing 26 of the bottom container 22 to provide securement of the top and bottom containers 22, 24.

The action of unloading the top container 24 from the bottom container 22 causes the interbox connector 30 to move from the latched position (as seen in FIGS. 7A-7C) back to the unlatched position (as seen in FIGS. 5A-5C) to automatically unlock the interbox connector 30 from both the top container 24 and the bottom container 22. Removal of the top container 24 from the bottom container 22 causes the top latch 42 and bottom latch 44 to automatically rotate. The top latch 42 is unlocked from locking engagement with the bottom corner casting 28 of the top container 24 and the bottom latch 44 is unlocked from locking engagement with the top corner casting 26 of the bottom container 22. A wall 92 of the top latch 42 contacts an inner wall 90 of the bottom corner casting 28 as the top container 24 is removed from the bottom container 22 and a force is acted upon the top latch 42 causing the top latch to rotate in a direction opposite the direction when being moved to the latched position. This rotation of the top latch 42 maintains contact between the top latch 42 and the lever 46 as top container 24 is removed from the bottom container 22. The lever 46 contacts the bottom latch 44 to maintain the bottom latch 44 in engagement with the top corner casting 26 of the bottom container 22 as the top container 24 is removed off of the middle plate 40. (See FIG. 6B). The contact of the lever 46 with the bottom latch 44 is maintained as the top container 28 is being lifted out of contact with the top latch 42. The spring 50, in turn, applies a force to rotate the top latch 42 in a clockwise direction (as seen from the views in FIGS. 5-7) to the unlatched position in response to the top container 24 being removed from contact with the bottom container 22. The pair of springs 52 mechanically coupled on opposing sides of the bottom latch 44 cause the bottom latch 44 and the lever 46 to rotate in this direction (e.g. clockwise direction as seen in views of FIGS. 5-7). This causes the bottom latch 44 to become disengaged from the top corner casting 26 of the bottom container 22 when the top container 24 is unloaded off of the bottom container 22. (See FIG. 5B).

Figure 8A:
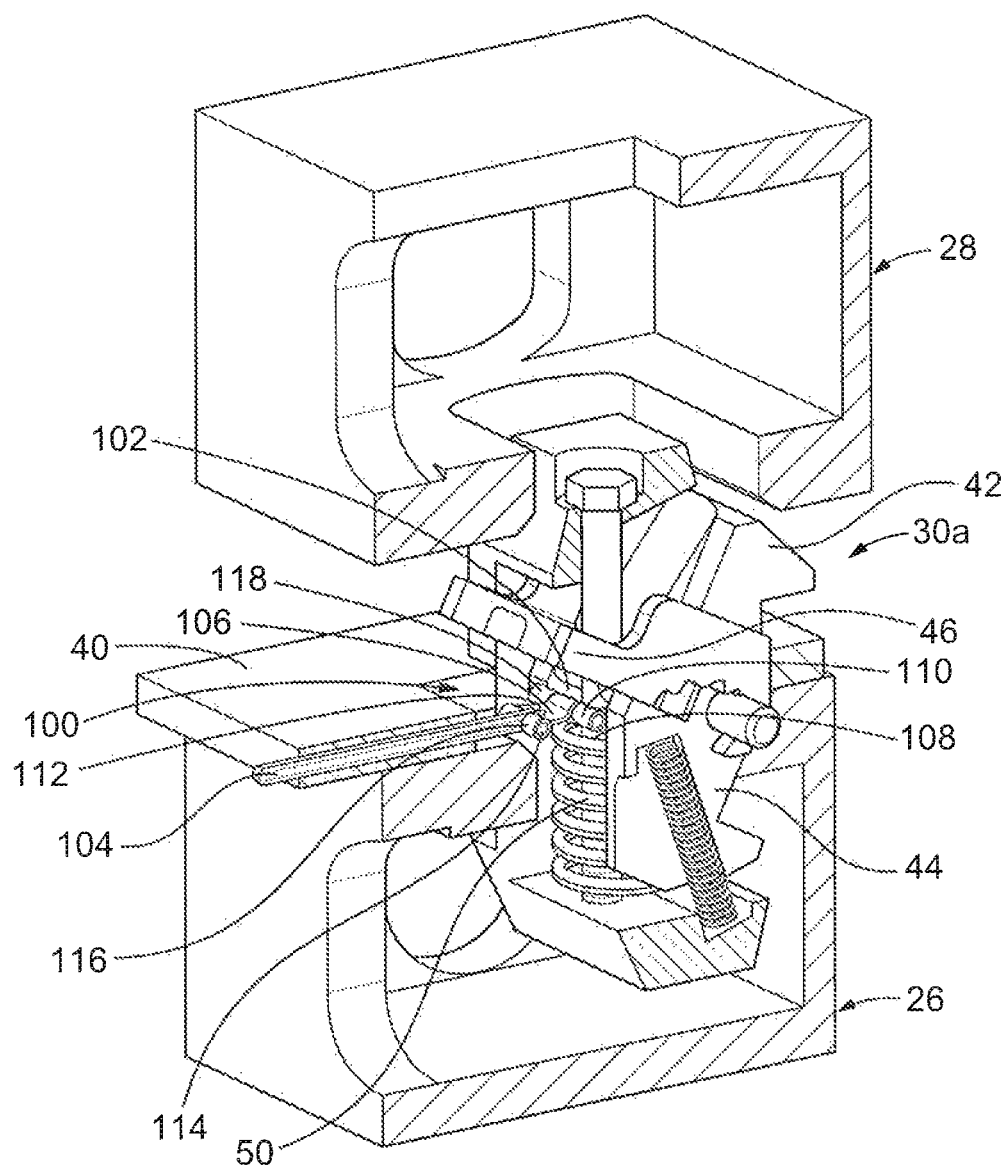
FIG. 8A is an isometric partial cut away view of an alternative embodiment of an interbox connector having an indicator device with the interbox connector positioned within a top corner casting for a bottom container and a bottom corner casting for a top container positioned above the interbox connector.
Figure 8B:
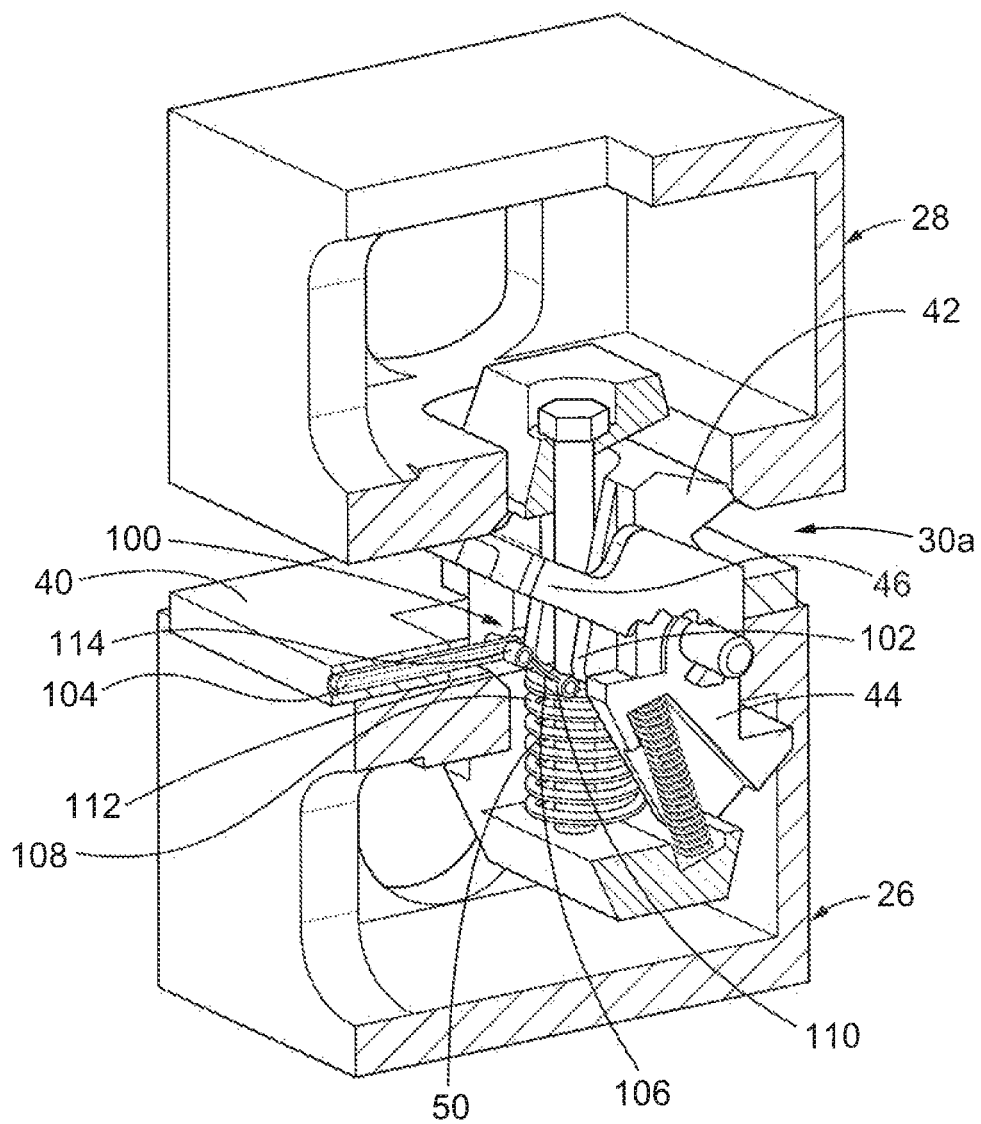
FIG. 8B is an isometric partial cut away view of the interbox connector of FIG. 8A illustrating the bottom corner casting of the top container engaging a top latch of the interbox connector moving the top latch to an unlatched position.
Figure 8C:
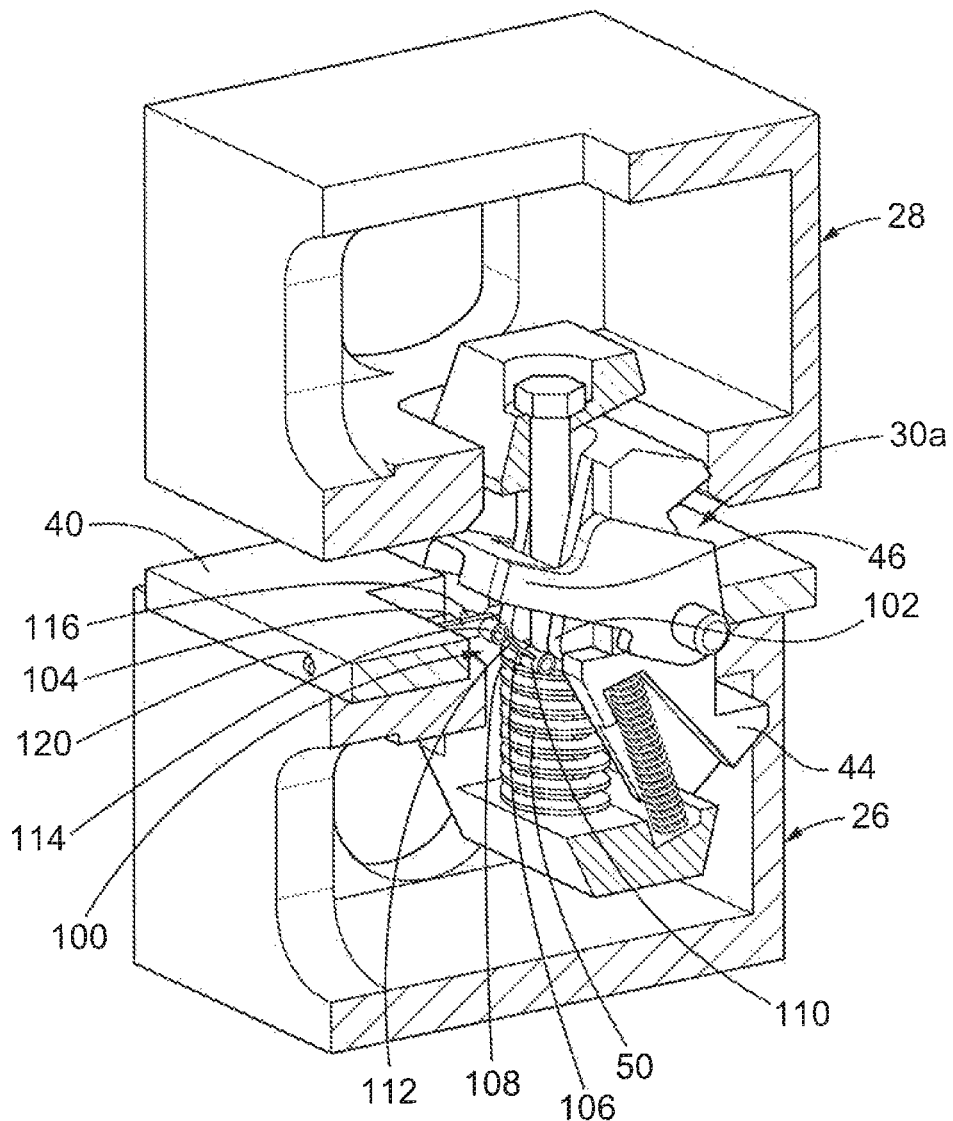
FIG. 8C is an isometric partial cut away view of the interbox connector similar to FIG. 8B without a cut away portion of a middle plate.
Figure 8D:
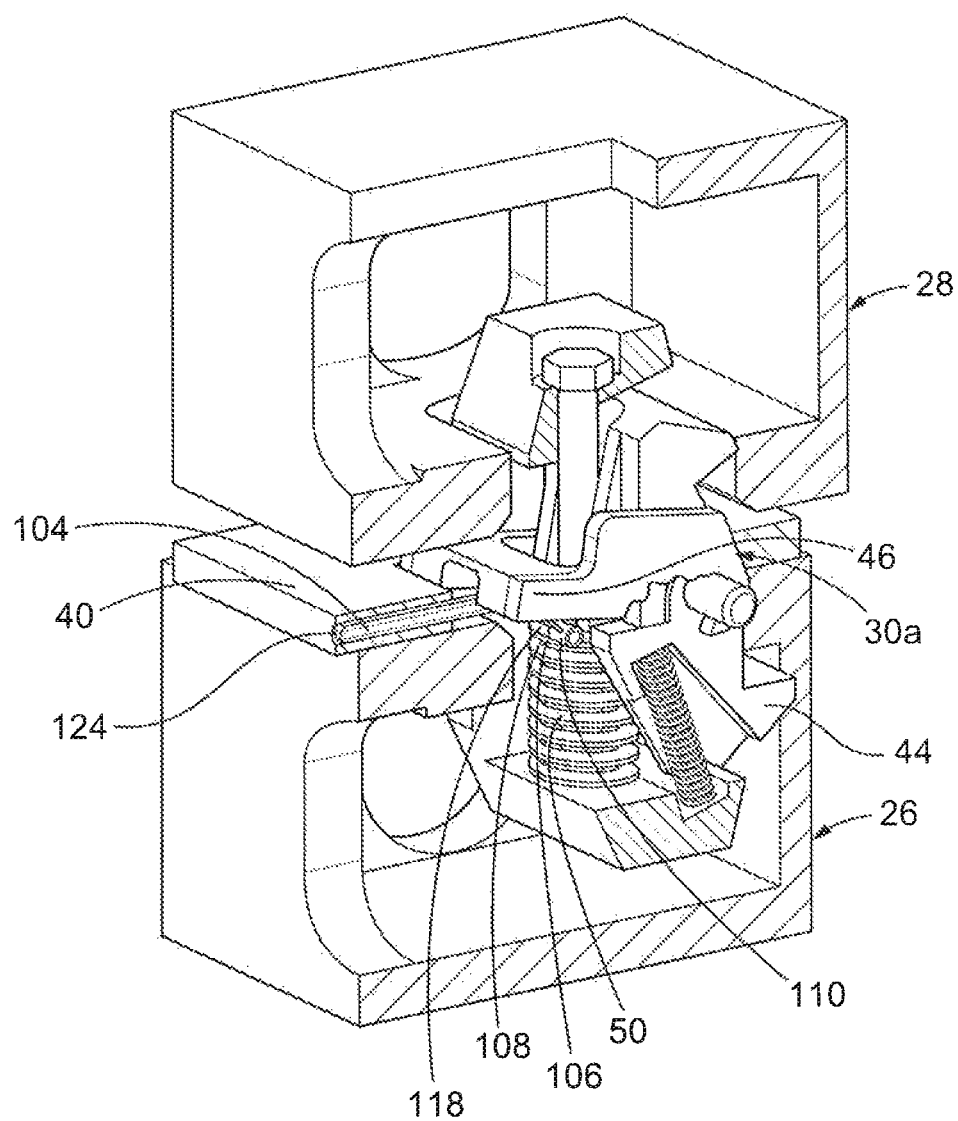
FIG. 8D is an isometric partial cut away view of the interbox connector of FIG. 8A illustrating the bottom corner casting of the top container engaging a lever and the top latch of the interbox connector.

Referring to FIGS. 8A-8F and 9, an alternative embodiment of an interbox connector 30A having an indicator device 100 to provide an indication of the top latch 42 being in a latched or unlatched position is shown. As seen in FIG. 8A, the interbox connector 30A is shown positioned within the top corner casting 26 of the bottom container 22 and the bottom corner casting 28 of the top container 24 is positioned above the interbox connector 30A. The large spring 50 engages lower back wall 102 of the top latch 42. The large spring 50 is in the extended position and accordingly spring biases the top latch 42 to the forward/latched position. The indicator device 100, in this example, includes a movable indicator member 104 that interacts with a link mechanism 106. (See FIG. 9) As seen herein, the link mechanism 106 is disposed proximate a top portion 108 of the large spring 50 and moves as the spring 50 moves from the extended position (FIG. 8A) to the compressed position (FIGS. 8B-8D). In particular, a spring follower 109 (FIG. 9) is disposed at an end of the link mechanism 106 such that the spring follower 109 is positioned between the top portion 108 of spring 50 and the lower back wall 102 of top latch 42. In this example, the spring follower 109 may comprise a flat washer positioned at the top portion 108 of the large spring 50. The link mechanism 106, in this example, includes a cross bar member 110 and a fork member 112. The cross bar member 110 is disposed for securement proximate to the top portion 108 of the large spring 50. (See FIGS. 8A, 9) The fork member 112 is secured, at one end, by one or more pins 114 to the indicator member 104 with collars 116 disposed about the pins 114. Another end of the fork member 112 is secured by another collar 118 to the cross bar 110. When the spring 50 is in the extended position, as seen in FIG. 8A, the link mechanism 106 places the indicator member 104 in a fully extended lateral position such that the indicator member 104 is pushed laterally outward. As the spring 50 compresses, as seen in FIGS. 8B-8D, the cross bar member 110 secured to spring follower 109 moves down with the spring 50 and the fork member 112 laterally pulls the indicator member 104 inward as collar 118 of the fork member 112 moves down with the cross bar member 110 attached thereto. In this example, the indicator member 104 may be a rod that is movable between one position to another position; however, other suitable indicators may selectively be employed.

As seen in FIG. 8A, the indicator member 104 is extended laterally outward to indicate the large spring 50 is in the spring loaded uncompressed position thereby placing the top latch 42 in the forward/latched position. In the arrangement seen in FIG. 8A, the lever 46 is fully extended upwards and the bottom latch 44 is in the unlatched position. In FIG. 8B, as the bottom corner casting 28 of the top container 24 is lowered onto the top corner casting 26, the top latch 42 engages the bottom corner casting 28 and thereby, rotates back in a counterclockwise direction, in this example. This rotational movement of the top latch 42 causes the top latch 42 to push down and compress the large spring 50 thereby causing the bottom latch 44 to rotate towards a latched position. Movement of the large spring 50 and spring follower 109 (FIG. 9) causes the cross bar 110 of the link mechanism 106 to also move in a downward direction thereby pulling the indicator member 104 laterally inward via the coupling with the fork member 112. As seen in FIG. 8C, the indicator member 104 may be positioned within a bore 120 through the middle plate 40 and as the indicator member 104 moves inward into the bore 120 of the middle plate 40 an indication is provided that the large spring 50 is being compressed and the top latch 42 is in an unlatched position. FIG. 8D illustrates the bottom corner casting 28 being lowered further towards the top corner casting 26 with the top latch 42 still in an unlatched position, but just prior to the top latch 42 being spring biased forward to a latched position within the bottom corner casting 28. As seen in FIG. 8D, the lever 46 engages and is pushed down by the bottom corner casting 28 and the indicator member 104 is continued to be pulled inward as the large spring 50 is moved to a compressed position. The bottom latch 44 is also maintained in a latched position.

Figure 8E:
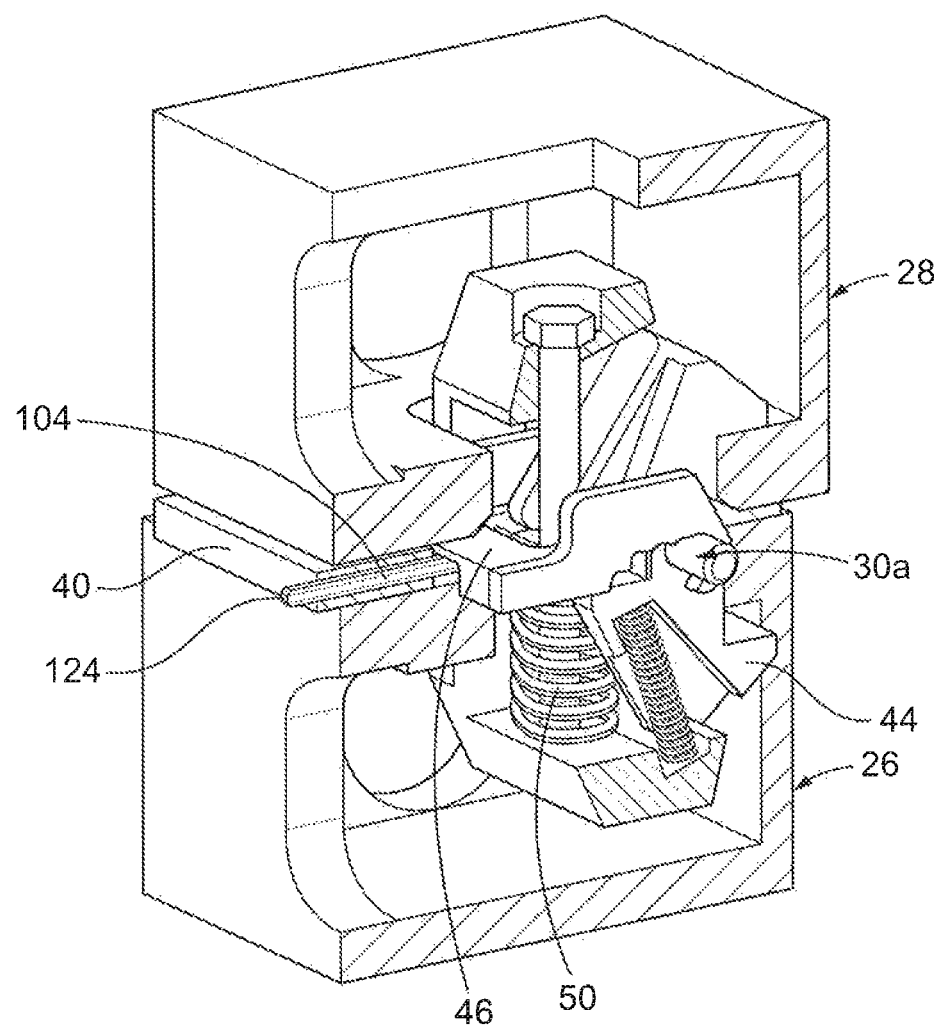
FIG. 8E is an isometric partial cut away view of the interbox connector of FIG. 8A in the latched position with the bottom corner casting of the top container lowered onto the top corner casting of the bottom container.
Figure 8F:
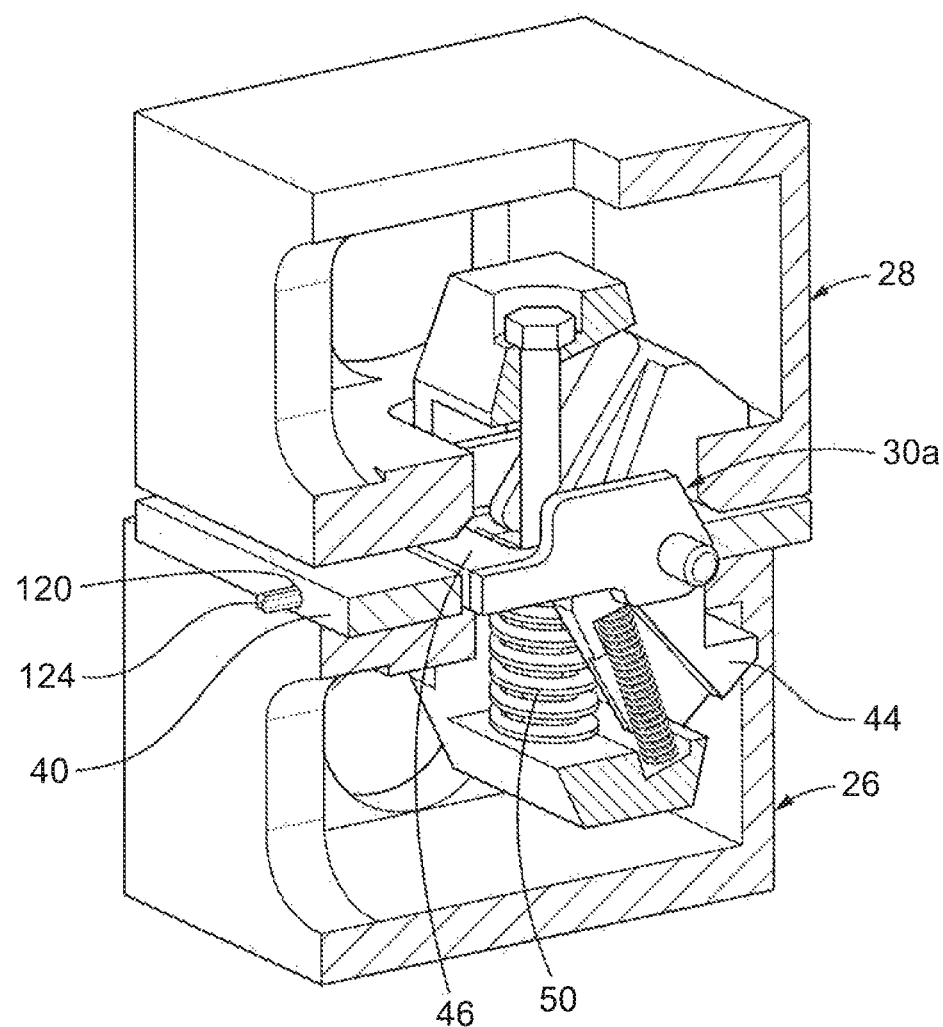
FIG. 8F is an isometric partial cut away view of the interbox connector similar to FIG. 8E without a cut away portion of the middle plate.
Figure 9:
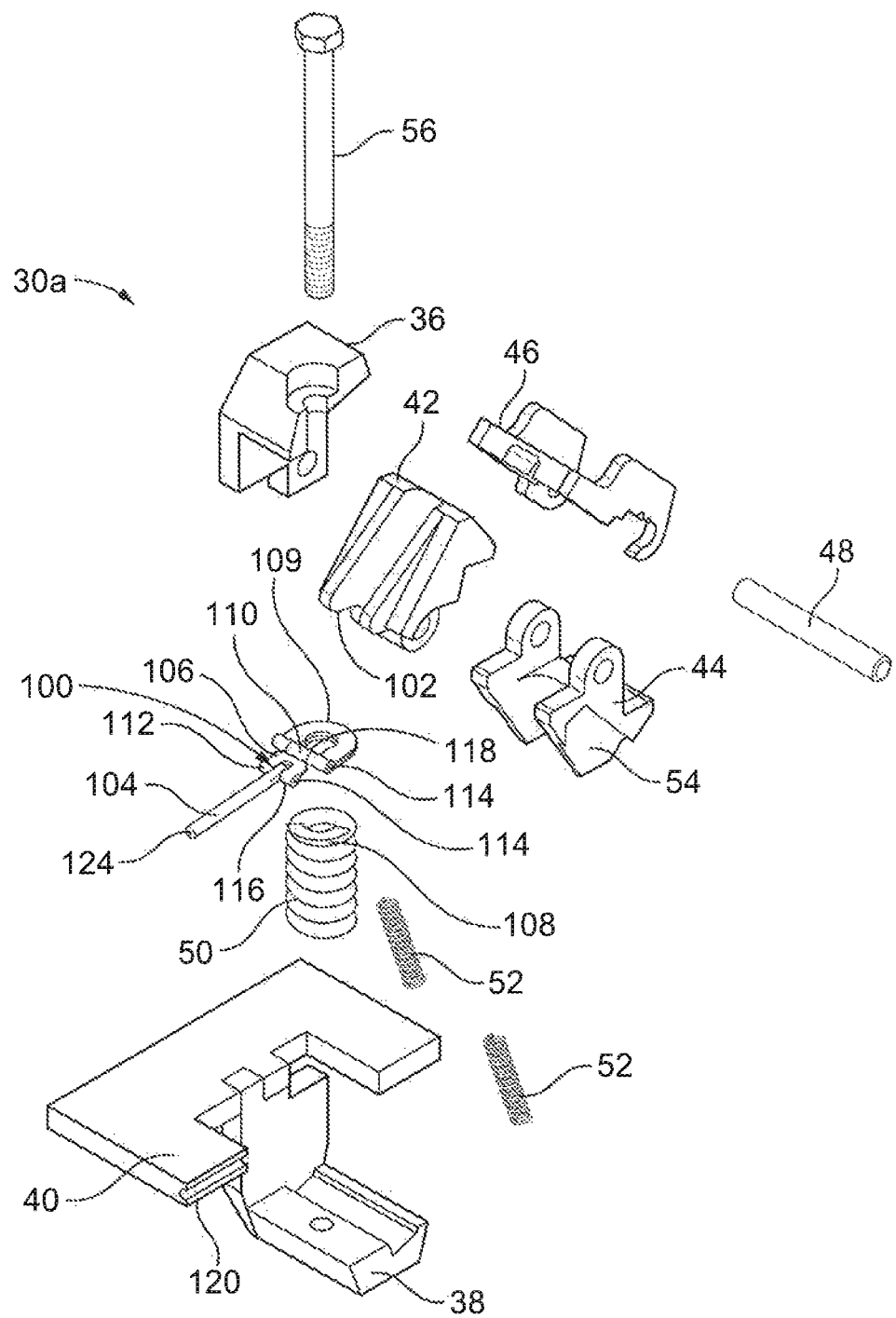
FIG. 9 is a partial exploded view of the alternative embodiment of the interbox connector of FIG. 8A.

FIG. 8E illustrates the bottom corner casting 28 being placed on the middle plate 40 atop the top corner casting 26 such that the top latch 42 is spring biased to the latched position to provide securement of the bottom corner casting 28. The lever 46 is pushed down atop the top corner casting 26 and maintains the bottom latch 44 in the latched position to provide securement to the top corner casting 26. The large spring 50 springs back from the compressed position to its original position, as seen in FIG. 8A. As the large spring 50 expands from the compressed position, the indicator member 104 is pushed laterally outward through the bore 120 via the link mechanism 106 and spring follower 109 coupled between the large spring 50 and the indicator member rod 104. The cross bar 110 attached to spring follower 109 moves upward with the large spring 50 and the fork member 112 rotates to push the indicator member 104 laterally outwards such that the end portion 124 of the indicator member 104 extends outside the bore 120 of the middle plate 40, as seen in FIG. 8F. This provides an indication to an observer that the large spring 50 has expanded from being compressed and the top latch 42 is spring biased to the latched position thereby providing securement to the bottom corner casting 28. As seen in this example, the indicator member is moveable between one position in which the top latch 42 is in a latched position and another position in which the top latch 42 is in an unlatched position. The indicator member 104 is coupled to the large spring 50 by link mechanism 106 and spring follower 109 such that the indicator member moves inward toward the position indicating the top latch 42 being unlatched when the large spring 50 is being compressed. In this example, the indicator member 104 may be a rod having a portion 124 that extends out from the middle plate 40 to be visible in the one position (FIG. 8F) and is movable inwards towards the interior of the plate 40 to the other position (FIG. 8C) in which the rod is less visible.

Upon removal of the bottom corner casting 28 from the top corner casting 26, the indicator member, large spring, top latch, bottom latch, etc. operate in a similar fashion, but in reverse order, as shown in FIGS. 8E, 8D, 8C, 8B and 8A. The indicator member 104 laterally moves inward and outward, for example, to provide indications of the top latch 42 being in a latched or unlatched position. The indicator member 104 extending outward, FIGS. 8A, 8F, provide an indication that the large spring 50 is extended from the compressed position and provides a spring bias force to the top latch 42 rotating the top latch 42 to an engaged/latched position. The indicator member 104 being moved inward such that the end portion 124 is drawn into the bore 120 of the middle plate 40 provides an indication that the large spring 50 is being compressed and the top latch 42 is moved back away from the latched position. This may provide an indication to an observer that the interbox connector 30A may not be fully secure yet and appropriate caution can be taken until proper securement can be confirmed.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

We claim:

1. An interbox connector for securement of a top container to a bottom container, the top container having a corner casting and the bottom container having a corner casting, the interbox connector comprising:
    a plate configured to be positioned between the corner casting of the bottom container and the corner casting of the top container prior to the top container being stacked on the bottom container;
    a first latch extending upwardly from the plate, the first latch being configured to be disposed in the corner casting of the top container in an unlatched position; and
    a second latch extending downwardly from the plate, the second latch being configured to be disposed in the corner casting of the bottom container in an unlatched position;
    wherein placement of the top container on top of the bottom container causes the second latch and the first latch to both automatically rotate into a latched position and secure the top container to the bottom container and wherein removal of the top container from the bottom container causes the first latch and the second latch to automatically rotate and unlock the first latch from locking engagement with the corner casting of the top container and subsequently unlock the second latch from locking engagement with the corner casting of the bottom container.

2. The interbox connector of claim 1 wherein the first latch and the second latch are positioned to rotatably pivot about the same axis.

3. The interbox connector of claim 2 wherein the first latch has a sloped surface, such that the sloped surface is configured to contact the corner casting of the top container as the top container is lowered on top of the bottom container causing the first latch and second latch to both automatically rotate in one direction.

4. The interbox connector of claim 3 wherein the first latch has at least one bore and the second latch has at least one bore whereby a pin is positioned through the at least one bore of the first latch and the at least one bore of the second latch such that the first latch and the second latch are rotatable about a longitudinal axis of the pin.

5. The interbox connector of claim 4 wherein the pin is secured to the plate enabling the first latch to rotate above the plate and the second latch to rotate below the plate.

6. The interbox connector of claim 4 further comprising a lever having at least one bore wherein the pin is positioned through the at least one bore of the lever for rotatable movement of the lever about the pin.

7. The interbox connector of claim 6 wherein the lever is mechanically coupled with the second latch and the lever is positioned to contact the top container when the top container is lowered onto the bottom container such that the weight of the top container on the lever maintains the lever in contact with the second latch whereby the second latch is held in contact with the corner casting of the bottom container.

8. The interbox connector of claim 3 further comprising an indicator member moveable between one position in which the first latch is in a latched position and another position in which the first latch is in an unlatched position.

9. The interbox connector of claim 8 wherein the indicator member is coupled to a spring such that the indicator member moves toward the other position upon compression of the spring.

10. The interbox connector of claim 9 wherein the indicator member is a rod having a portion that extends out from the plate in the one position and the portion of the rod is moved inwards towards the plate in the other position.

11. The interbox connector of claim 2 wherein the first latch continues to rotate until the first latch is positioned inside an aperture of the corner casting of the top container.

12. The interbox connector of claim 11 further comprising a spring mechanically coupled with the first latch wherein the spring applies a force to the first latch to move the first latch into the corner casting of the top container in response to the top container being lowered onto the bottom container.

13. An interbox connector for securement of a top container to a bottom container, the top container having a corner casting and the bottom container having a corner casting, the interbox connector comprising:
    a plate configured to be positioned between the corner casting of the bottom container and the corner casting of the top container prior to the top container being stacked on the bottom container;
    a first latch extending upwardly from the plate, the first latch having a sloped surface and being configured to be disposed in the corner casting of the top container;
    a second latch extending downwardly from the plate, the second latch being configured to be disposed in the corner casting of the bottom container;

wherein the first latch and the second latch are positioned to rotatably pivot about the same axis;

wherein the sloped surface of the first latch engages a wall of an opening of the corner casting of the top container such that a camming action is applied to the first latch and causes the second latch to rotate in the same direction of the first latch; and wherein placement of the top container on top of the bottom container causes the second latch and the first latch to automatically rotate and secure the top container to the bottom container.

14. The interbox connector of claim 13 wherein removal of the top container from the bottom container causes the first latch and second latch to automatically rotate and unlock the first latch from locking engagement with the corner casting of the top container and subsequently unlock the second latch from locking engagement with the corner casting of the bottom container.

15. The interbox connector of claim 14 wherein a wall of the first latch contacts an inner wall of the corner casting of the top container as the top container is removed from the bottom container such that a force is acted upon the first latch causing the first latch to rotate in a direction opposite the one direction.

16. The interbox connector of claim 15 further comprising a spring mechanically coupled with the first latch, the spring applies a force to rotate the first latch to an unlatched position in response to the top container being removed from contact with the bottom container.

17. The interbox connector of claim 16 further comprising a pair of springs mechanically coupled on opposing sides of the second latch such that, in response to the top container being removed from contact with the bottom container, the pair of springs cause the second latch and the lever to rotate, wherein the second latch becomes disengaged from the corner casting of the bottom container.

18. The interbox connector of claim 14 further comprising a lever mechanically coupled with the first latch and the second latch, wherein the first latch contacts the lever as the top container is removed from the bottom container, and wherein the lever contacts the second latch to maintain the second latch in engagement with the corner casting of the bottom container as the top container is removed from contact with the plate.

19. An interbox connector for securement of a top container to a bottom container, the top container having a corner casting and the bottom container having a corner casting, the interbox connector comprising:

a plate configured to be positioned between the corner casting of the bottom container and the corner casting of the top container prior to the top container being stacked on the bottom container;

a first latch extending upwardly from the plate, the first latch being configured to be disposed in the corner casting of the top container in an unlatched position;

a second latch extending downwardly from the plate, the second latch being configured to be disposed in the corner casting of the bottom container in an unlatched position;

wherein the first latch and the second latch are positioned to rotatably pivot about the same axis;

wherein the first latch continues to rotate until the first latch is positioned inside an aperture of the corner casting of the top container; and wherein rotation of the first latch causes the second latch to enter an aperture of the corner casting of the bottom container and engage the corner casting of the bottom container.

* * * * *